United States Patent
Kim et al.

(10) Patent No.: US 10,120,828 B2
(45) Date of Patent: Nov. 6, 2018

(54) BRIDGE FOR BUS-POWERED PERIPHERAL DEVICE POWER MANAGEMENT

(71) Applicant: Seagate Technology LLC, Cupertino, CA (US)

(72) Inventors: BongKyom Kim, Suwon-si (KR); DongWook Lee, Yongin-si (KR); ByungWook Kim, Suwon-si (KR); NamGeun Kim, Hwaseong-si (KR)

(73) Assignee: Seagate Technology LLC, Cupertino, CA (US)

( * ) Notice: Subject to any disclaimer, the term of this patent is extended or adjusted under 35 U.S.C. 154(b) by 469 days.

(21) Appl. No.: 14/549,311

(22) Filed: Nov. 20, 2014

(65) Prior Publication Data

US 2016/0147701 A1 May 26, 2016

(51) Int. Cl.
| | | |
|---|---|---|
| *G06F 13/00* | (2006.01) | |
| *G06F 1/00* | (2006.01) | |
| *G06F 13/42* | (2006.01) | |
| *G06F 13/40* | (2006.01) | |
| *G06F 13/38* | (2006.01) | |
| *G06F 1/26* | (2006.01) | |

(52) U.S. Cl.
CPC .......... *G06F 13/4221* (2013.01); *G06F 1/266* (2013.01); *G06F 13/382* (2013.01); *G06F 13/4027* (2013.01)

(58) Field of Classification Search
None
See application file for complete search history.

(56) References Cited

U.S. PATENT DOCUMENTS

| 7,752,471 | B1 | 7/2010 | Kolokowsky | |
|---|---|---|---|---|
| 8,074,016 | B2 | 12/2011 | Ahmad et al. | |
| 8,390,949 | B2 | 3/2013 | Ahmad et al. | |
| 2007/0088967 | A1* | 4/2007 | Fu | G06F 1/266 713/340 |
| 2008/0239681 | A1* | 10/2008 | Iida | G06F 13/387 361/752 |
| 2009/0274027 | A1* | 11/2009 | Tanaka | G11B 19/209 369/47.55 |
| 2012/0159208 | A1 | 6/2012 | Intrater | |
| 2013/0311683 | A1 | 11/2013 | Mundt et al. | |
| 2014/0281218 | A1* | 9/2014 | Kakish | G06F 1/266 711/114 |
| 2015/0089088 | A1* | 3/2015 | Kuo | G06F 13/4086 710/5 |
| 2015/0160705 | A1* | 6/2015 | Chen | G06F 1/26 713/300 |

* cited by examiner

*Primary Examiner* — Hyun Nam
(74) *Attorney, Agent, or Firm* — Taylor English Duma LLP

(57) ABSTRACT

Technologies are described herein for power management in a peripheral device. A bridge is coupled to a communication link that provides power. The bridge determines an available power from the communication link. The bridge informs a peripheral device coupled to the bridge of the available power.

12 Claims, 7 Drawing Sheets

BRIDGE FOR BUS-POWERED PERIPHERAL DEVICE POWER MANAGEMENT

BRIEF SUMMARY

The present disclosure relates to technologies for power management, particularly for peripheral devices such as disc drives.

According to some embodiments, a method comprises coupling a bridge to a communication link that provides power; determining an available power from the communication link; and informing a peripheral device coupled to the bridge of the available power.

According to further embodiments, an apparatus comprises a first interface configured to be coupled to a host with a communication link; a second interface configured to be coupled to a peripheral device that is configured to receive power from the host through the communication link; and control circuitry coupled to the first and second interfaces, and configured to determine an available power from the host and to inform the peripheral device of the available power.

According to some embodiments, a method comprises coupling a mass storage device to a bridge; receiving power at the mass storage device from the bridge; receiving available power information at the mass storage device from the bridge; and configuring power usage of the mass storage device responsive to the available power information.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale.

DETAILED DESCRIPTION

The following detailed description is directed to power management for a peripheral device.

Computers interact with peripheral devices, such as printers, disc drives, keyboards, mice, flash drives, cameras, scanners, monitors, speakers and other input and/or output devices. Some of these peripherals communicate with the computer through a communication link. The communication link can be wired, wireless or optical, for example. Some examples of communication links, also known as buses, are ISA, PCI, ATA, VESA, I²C, SCSI, Thunderbolt, front-side bus, USB, IEEE 1394, etc. These communication links can have their own protocol, share protocols or use various protocols. Some of these communication links provide power to a peripheral device to obviate the need for the peripheral device to have an additional power source. Peripheral devices that obtain power from the communication link are bus-powered devices.

Sometimes connecting a peripheral device to a bus is not possible since the two have different interfaces. For example, a mass storage device can have a serial advanced technology attachment (SATA) interface. To couple the SATA mass storage device to a universal serial bus (USB) bus, for instance, a bridge can be used. The bridge can act as an adapter for the communication links by converting one communication protocol to the other. Thus information provided on the USB bus can be converted to information on the SATA bus. The information can include data and commands.

Figure 1:
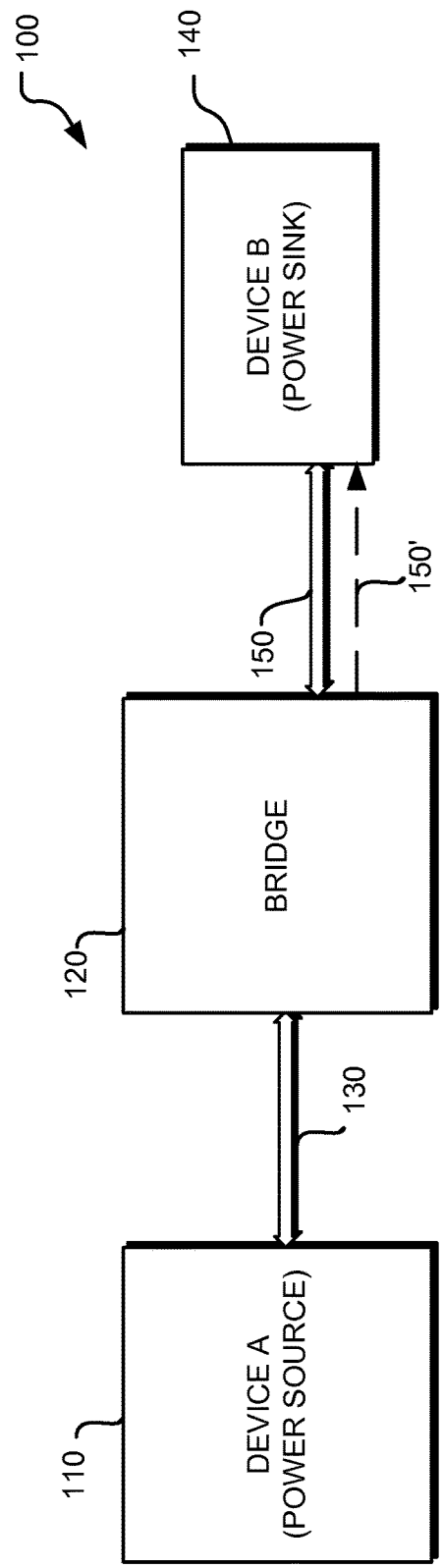
FIG. 1 is a block diagram showing a system that employs a relaying of power information between a power source and power sink, according to embodiments described herein.

FIG. 1 illustrates some of the concepts described above. A system 100 includes a device A 110 coupled to a bridge 120 through a communication link 130. Device A 110 can be a computer or, more generally, a host. Device A 110 provides power over communication link 130. Bridge 120 can be an ASIC, FPGA, ASSP, standard part or other type of IC. Bridge 120 can include other components to provide its functionality, such as other ICs, as well as discrete, analog and digital devices. Bridge 120 is coupled to a device B 140 via a communication link 150. Device B 140 is a bus-powered device in that it gets power from communication link 150, and can be a peripheral device as described above.

Information such as data and commands can be transmitted over communication links 130 and 150. Specifically, device A 110 can communicate with device B 140 through bridge 120. Bridge 120 converts, if need be, between the protocols for communication links 130 and 150. In some cases, bridge 120 can function in such a manner that either device A 110 or device B 140, or both, appear to be connected to the other device without the intervention of bridge 120.

Device B 140 can have certain power requirements that may or may not be available from communication link 130. Since bridge 120 is disposed between the two devices, device B 140 may not be able to determine the power available from communication link 130. In this situation, device B 140 may have to operate at some predetermined power level. An alternative is to have bridge 120 determine the power available from communication link 130, and pass information to device B 140 that indicates the available power. With that information device B 140 can then configure itself to operate with the available power. One way bridge 120 can pass this information to device B 140 is through communication link 150, for instance using a pin, wire, channel or slot in communication link 150 that is not used. Another way bridge 120 can pass this information is by using a lead 150' that is separate from communication link 150. Lead 150' can also be a multi-bit bus, single wire, wireless or optical. In either case, the information can be a simple voltage or bit to indicate the available power, or data that provides more detail. A further way for bridge 120 to pass the information to device B 140 is to use the protocol for communication link 150. In particular, the information can be passed as a command or a parameter of a command, a reserved or unused bit or bits (field), or any other way simply using the protocol.

Another embodiment will be described with reference to FIG. 2. Shown is a system 200 that includes a computer 210 that has a USB connector (not shown), a bridge device 220 and a mass storage device 280 (shown as a disc drive). An operation of system 200 will be illustrated for the case where computer 210 writes data to mass storage device 280. A bus 215 connected between computer 210 and a USB connector 230 of bridge device 220 provides information such as the data to be written, the addresses of the locations in the mass storage device to write the data and the write command. An example of bus 215 is shown in FIG. 3. There, a cable 300 is shown that can provide USB 2.0 and USB 3.0 signals and power. Included in cable 300 is a ground wire 310 and a power wire VBus 320. Data wires 330 are used for USB 2.0. Differential pair 340 are for receiving data under USB 3.0, and differential pair 350 are for transmitting date under USB 3.0.

Returning to FIG. 2, USB connector 230 can be any version of USB, such as 2.0 and 3.0. In particular, connector 230 can be a jack such as type A or B, mini-A or -B, or micro-A or -B. As such, a ground or reference potential 232 is coupled to a corresponding pin in USB connector 230. Likewise, power from a corresponding pin in USB connector 230 is provided on lead 234 to power supply 250. A lead 260 from power supply 250 provides power to mass storage device 280. Power is also provided within bridge device 220 by a lead 236 that may form a tree to the components of bridge 220 that need power. For some configurations, power from USB connector 230 can be directly provided to mass storage device 280 without intervention of power supply 250. For example, a 2.5" disc drive can use 5V and USB 2.0 power is 5V. In this case the power from USB connector 230 can be provided to mass storage device 280 directly.

A bus 238 provides the information to USB PHY 240 where the information is further provided to a USB controller 244 by a bus 242. USB controller 244 can provide functions such as the USB link and protocol layers, USB power management, busy and ready signals, etc. USB controller 244 stores the information to a buffer 248 over a bus 246. A bridge controller 254 reads part or all of the information from buffer 248 over a bus 256. Then, under control of a program (firmware) stored in a memory 258, bridge controller 254 converts the information to that which is compatible with the SATA protocol. The converted information is then saved to buffer 248, where it is subsequently accessed by a SATA controller 270 over bus 252. Similar to USB controller 244, SATA controller 270 can provide functions such as the SATA link and protocol layers, power management, busy and ready signals, etc. The converted information is provided to a SATA PHY 274 and a SATA connector 276 over respective buses 272, 278. The converted information is then provided over bus 290 to mass storage 280 to execute the included command. The SATA can be I, II or III.

Regarding the power management for the mass storage device, bridge controller 254 determines the power that is available from computer 210 over bus 230. In the system 200, when the bridge device 220 is plugged into the USB port at computer 210, the USB transmitter of bridge 220 (not shown) connected to computer 210 through bus 230 tries to detect if the USB receiver in computer 210 is terminated. Specifically, USB 3.0 receivers terminate the transmission line by placing a small resistor to ground or a resistor included in the host USB IC. Each transmitter will check for this termination resistor on the receiver as a way for detecting the presence of a USB 3.0 receiver. If the termination is not detected, the communication protocol over bus 215 will be downgraded to USB 2.0. If the detection fails, bridge device 220 knows that at least USB 2.0 is available, meaning an associated 500 mA are available. If the termination is detected, link training begins so that the receiver can synchronize with the transmitter. Once the link is established, the link enters the normal operational state where SuperSpeed signaling is enabled and 5 Gb packets are transmitted and received. When detected, bridge 220 knows computer 210 is configured for USB 3.0, meaning 900 mA are available.

With knowledge of which USB communication protocol is available, bridge circuit 220 can communicate a signal to mass storage device 280 that indicates the protocol. One way bridge device 220 can do that is to use an unassigned or reserved pin (e.g., pin 11) in the SATA communication link to mass storage device 280. Bridge controller 254 can pass control information for this pin to SATA controller 270 through buffer 249 or pass it as a parameter in the firmware. Bridge controller 254 can also control this pin directly. Another way to communicate is to use the general-purpose IO (GPIO) 282 such as shown in FIG. 2. GPIO 282 provides dedicated general-purpose pins that can be configured as either inputs or outputs. In this case, a pin of GPIO 282 can be configured to provide an output signal to the mass storage device over a lead 290'. The mass storage device can include a printed circuit board with a connection to which the GPIO output signal is received. From there circuitry or firmware, or both, can use the output signal to configure the mass storage to manage the power provided, such as for optimal performance. For the case of a disc drive, the output signal can indicate the power provided over the bus is enough to operate certain functions, such as motor spin up or actuator movement, at optimal levels.

Bridge 220 can be a packaged integrated circuit that includes all the components shown in bridge 220 except connectors 230, 276. Alternatively, bridge 220 can be comprised of two or more components or integrated circuits that are packaged (multi-chip package) or housed, or on a printed circuit board. Bridge 220 can also be integrated into a bus cable. An interface of bridge 220 for each bus can be simply a connector, like 230, 276; a physical layer, like 240, 274, a controller 244, 270, any combination thereof. Controllers 244, 254, 270 can be implemented as a single microcontroller.

Figure 4:
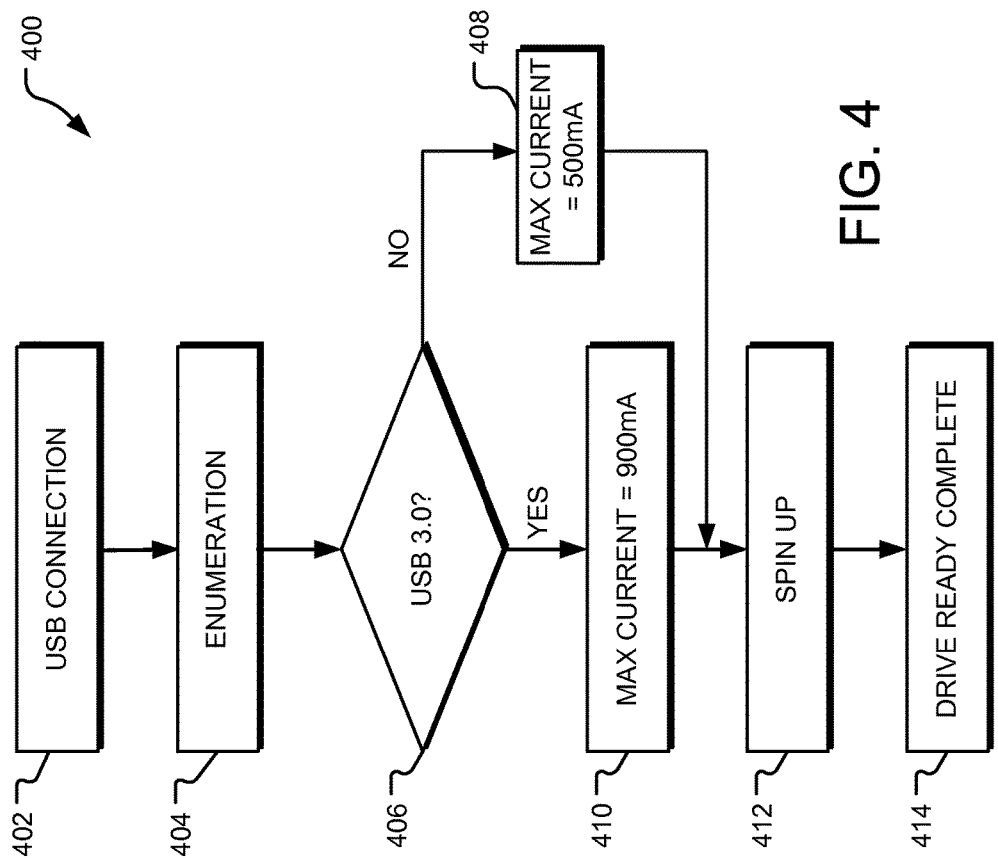
FIG. 4 is a flow diagram showing steps for performing a relaying of power information between a power source and power sink, according to embodiments described herein.

A method 400 is shown in FIG. 4. At step 402 a peripheral device is connected to a host. At step 404 enumeration is performed between the peripheral device and the host. USB Enumeration is the process of detecting, identifying and loading drivers for a USB device. At step 406 a determination is made whether the USB connection is under 2.0 or 3.0. If 2.0, then at step 408 information is passed to the peripheral device to indicate the maximum power available. As shown that maximum power includes 500 mA. Then method 400 proceeds to step 412 where, when the peripheral device rotates the storage medium for access, the motor is spun up. At step 414 the peripheral device indicates it is ready for access.

If at step 406 a determination is made the USB connection is under 3.0, then at step 410 information is passed to the peripheral device to indicate the maximum power available. As shown that maximum power includes 900 mA. Then method 400 proceeds to step 412 where it performs the remaining steps as explained. With method 400, the peripheral device can set its maximum current up to 900 mA.

Access time from start to target velocity can be reduced, as much as 25%. Besides, the maximum current peak for a seek is also adjustable so it can improve seek performance.

Figure 5:
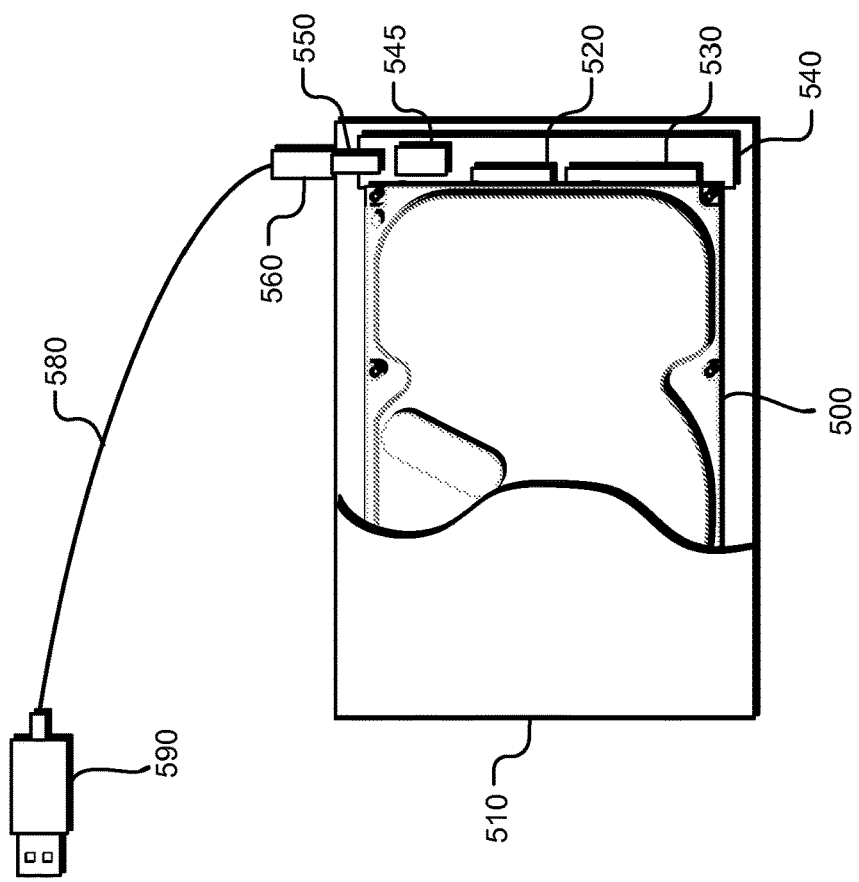
FIG. 5 is a diagram of a peripheral device and a bridge, according to embodiments described herein.

Further variations of system 100 include incorporating bridge 120 into device B 140 or packaging bridge 120 and device B 140 together, such as in the same housing. Likewise, bridge 120 can be incorporated into or packaged together with device A 110. Or bridge 120 can be physically separate from both device A 110 and device B 140. FIGS. 5-8 show examples of this. In FIG. 5 is a disc drive 500 within a housing 510 that can be an external enclosure. Also within housing 510 is a printed circuit board 540 that has a power connector 520 and a SATA connector 530. A bridge 545 is coupled between connectors 520, 530 and a USB connector 550. Shown connected to connector 550 is another connector 560, a cable 580 and a USB connector 590. Not shown is an optional lead from controller 545 to disc drive 500 that provides the available power information. A further alternative is similar to shown in FIG. 5, except housing 510 is omitted.

Figure 2:
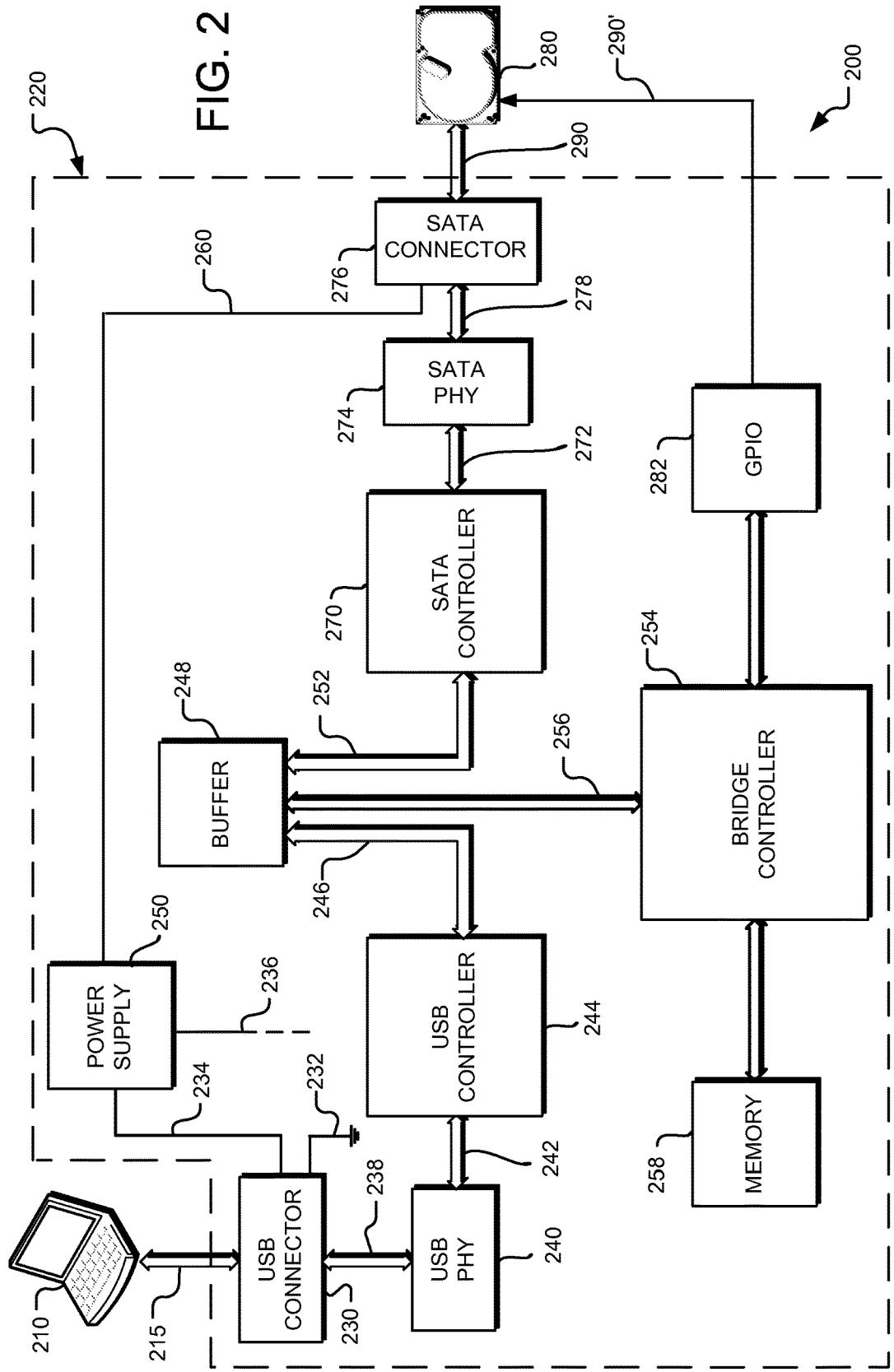
FIG. 2 is a block diagram showing a system that employs a relaying of power information between a power source and power sink, according to embodiments described herein.
Figure 3:
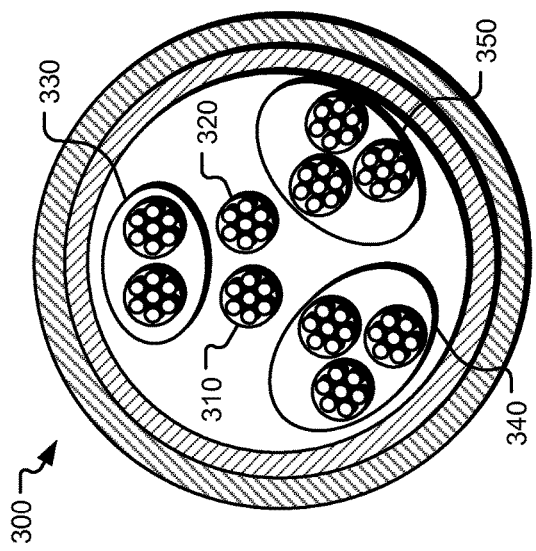
FIG. 3 is an illustration of a communication link.
Figure 6:
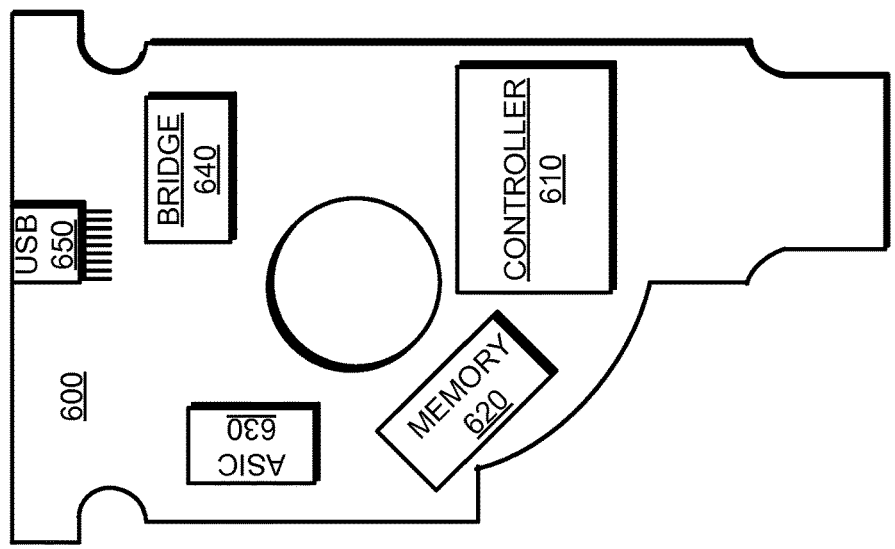
FIG. 6 is a diagram of a peripheral device and a bridge, according to embodiments described herein.
Figure 7:
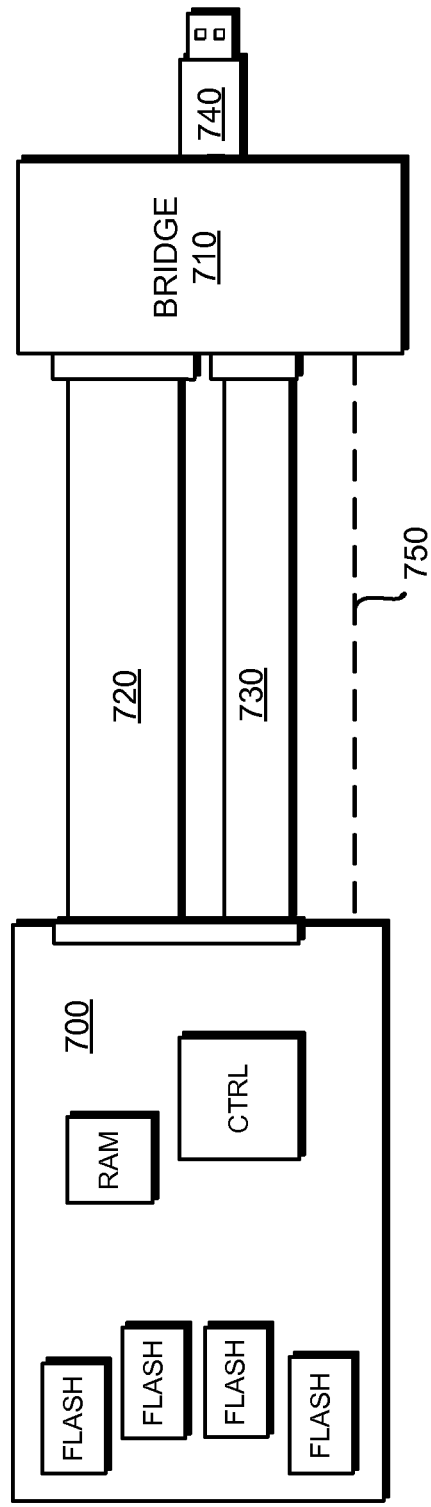
FIG. 7 is a diagram of a peripheral device and a bridge, according to embodiments described herein.

Alternatively, FIG. 6 shows a printed circuit board (PCB) 600 that can be included within a peripheral device, such as disc drive 500 shown in FIG. 2. Mounted on PCB 600 is a controller 610, memory 620 and power ASIC 630 that perform the functions of the disc drive. A bridge 640 is coupled between controller 610 or memory 620, or both, and a USB connector 650. This example allows the bridge to be tightly integrated with the disc drive, thus maintaining its form factor. Yet another combination of a peripheral device and a bridge is shown in FIG. 7. A peripheral device, shown as a solid state drive 700, is coupled to a bridge 710 by a power cable 720 and a SATA cable 730. Bridge 710 includes a USB connector 740. Shown is an optional lead 750 from controller 710 to solid state drive 700 that provides the available power information.

Figure 8:
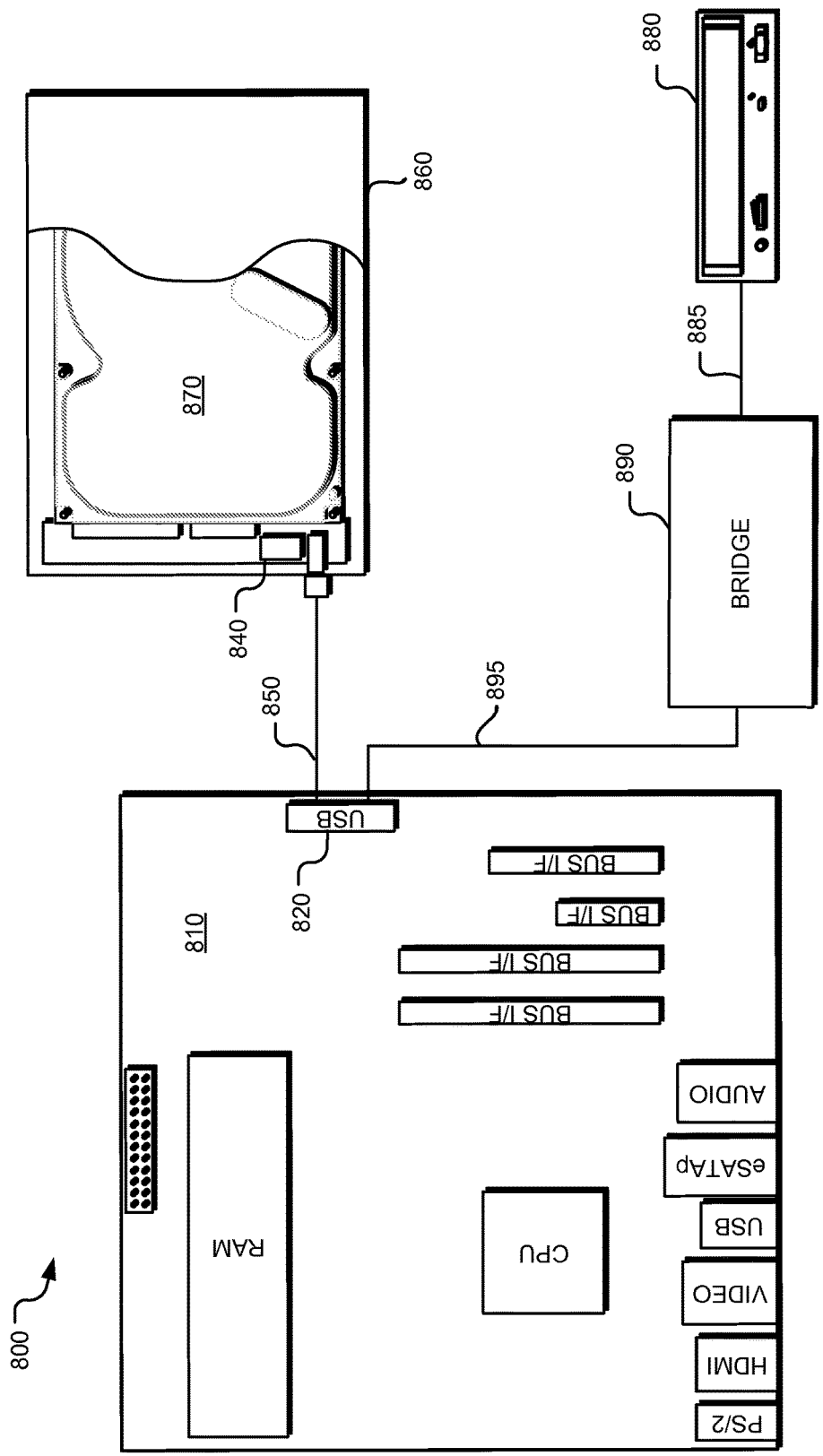
FIG. 8 is a diagram of a peripheral device and a bridge, according to embodiments described herein.

A further alternative is shown in FIG. 8. There, a system 800 is shown that includes a PCB 810. On PCB 810 is a USB connector (or a header) 820. A bus 850 couples USB connector 820 to a device 860 that includes a bridge 840 and a disc drive 870. Further shown is a peripheral device 880 (shown as an optical disc drive) that is coupled to a bridge 890 via a bus 885. Bridge 890 is further coupled to connector 820 via bus 895. If system 800 is a computer, PCB 810 is a motherboard and the peripheral devices can be mounted in the housing of the computer. Not shown for either peripheral is an optional lead that can relay the available power information from the respective bridge.

Figure 9:
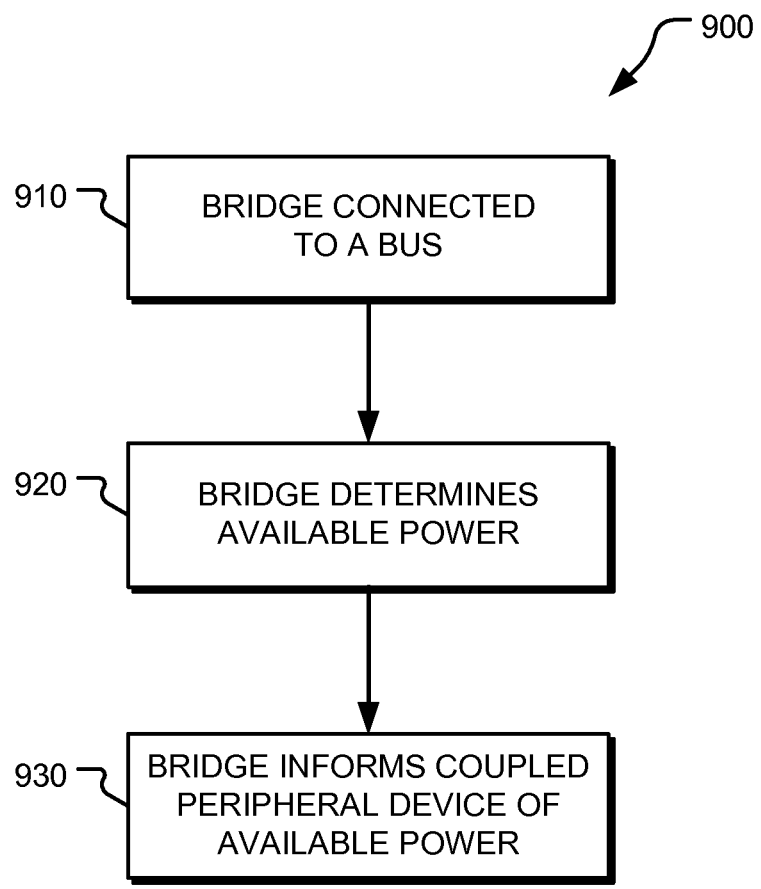
FIG. 9 is a flow diagram showing steps for performing a relaying of power information between a power source and power sink, according to embodiments described herein.

Another method is shown in FIG. 9. Method 900 includes step 910 of connecting a bridge to a bus. Step 920 has the bridge determine the available power from the bus. Step 930 has the bridge inform a peripheral device coupled thereto of the available power. The coupled peripheral device can use the information about the available power to configure its power usage. Method 900 encompasses a bridge determining the available power regardless of whether the interface to the power source has more than one version, e.g., standard or protocol.

Aspects of the described embodiments can include the bridge being preprogrammed with SATA information or descriptors. When coupled to a communication link, the enumeration process uses that information or descriptors. When the bridge determines the power available, it communicates available power information to the peripheral device. In this way the peripheral device can first power up using the available power information. This can also occur when the host system is powered up.

Aspects of the described embodiments provide for minimal hardware and/or firmware modifications. Using existing communication links to transmit the available power information requires minor firmware changes to the bridge and the peripheral device. While embodiments are described herein in regard to mass storage devices, it will be appreciated that the embodiments described in this disclosure may be utilized in any peripheral device that receives power over a bus, such as USB-based peripherals. Examples of mass storage devices are a magnetic disk drive, a hybrid disc drive, flash drive, solid-state drive, memory stick, an optical disk storage device and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. An apparatus comprising:
a first interface configured to be coupled to a host with a first communication link, the first interface further configured to receive power from the host through the first communication link;
a second interface configured to be coupled to a peripheral device with a second communication link, the second interface further configured to pass power from the host to the peripheral device through the second communication link; and
control circuitry coupled to the first and second interfaces, and configured to:

determine a version of a protocol utilized by the first communication link, and based on the determined version of the protocol, inform the peripheral device of a maximum available power from the host.

2. The apparatus of claim 1, wherein the first communication link comprises a Universal Serial Bus link and the second communication link comprises a Serial Advanced Technology Attachment.

3. The apparatus of claim 1, wherein the peripheral device is a mass storage device, and the maximum available power information is provided to the mass storage device through the second interface over a channel of the second communication link that is unused.

4. The apparatus of claim 1, wherein the peripheral device is a mass storage device, and the maximum available power information is provided to the mass storage device over a channel that is external to the second interface.

5. The apparatus of claim 1, wherein the maximum available power information comprises one of two maximum power levels associated with two different versions of the protocol utilized by the first communication link.

6. A method comprising:

coupling a bridge to a first communication link that provides power;

coupling the bridge to a peripheral device over a second communication link that passes the power to the peripheral device;

determining a version of a protocol utilized by the first communication link, the version of the protocol associated with a maximum available power from the first communication link; and informing the peripheral device of the maximum available power from the first communication link based on the determined version of the protocol.

7. The method of claim 6 wherein the peripheral device is a mass storage device.

8. The method of claim 6 further comprising providing the maximum available power to the peripheral device.

9. The method of claim 6, wherein the peripheral device is informed of the maximum available power over an unused channel of the second communication link.

10. A method comprising:

coupling a mass storage device to a bridge through a first communication link, the bridge coupled to a host by a second communication link, the host providing power over the second communication link;

receiving power at the mass storage device from the host through the bridge over the first communication link;

receiving available power information comprising a maximum current amount available from the host at the mass storage device from the bridge, the available power information determined by the bridge based on a version of a protocol utilized by the second communication link between the host and the bridge; and configuring power usage of the mass storage device responsive to the available power information.

11. The method of claim 10 wherein the mass storage device is a disc drive, the method further comprising controlling at least one of a spin up and a seek of the disc drive responsive to the available power information.

12. The method of claim 10, wherein the second communication link is a Universal Serial Bus link and the first communication link is a Serial Advanced Technology Attachment link.

* * * * *